March 19, 1963 — W. MacPHERSON — 3,081,661

ROTARY SHEARING KNIFE

Filed Nov. 8, 1957 — 2 Sheets-Sheet 1

INVENTOR.
WILLIAM MacPHERSON
BY
ATTORNEYS.

March 19, 1963  W. MacPHERSON  3,081,661
ROTARY SHEARING KNIFE

Filed Nov. 8, 1957  2 Sheets-Sheet 2

INVENTOR.
WILLIAM MacPHERSON
BY
ATTORNEYS

3,081,661
ROTARY SHEARING KNIFE

William MacPherson, Westlake, Ohio, assignor to Cowles Tool Company, Cleveland, Ohio, a corporation of Delaware
Filed Nov. 8, 1957, Ser. No. 695,406
14 Claims. (Cl. 83—676)

This invention relates to cemented carbide cylindrical or annular shapes backed by metal having desirable qualities, but having a greater coefficient of thermal expansion than that of the cemented carbide and the method for making same and in particular to rotary slitting or shearing knives having a cemented carbide annulus embracing cutting edges mounted on a metallic center portion and to the method for making them.

Rotary shearing knives such as those comprehended by my invention are, when used for slitting and cutting operations, generally mounted on a pair of rotatable arbors having spaced parallel axes of rotation. The material to be slit or sheared is fed between the arbors in a plane approximately parallel to their axes of rotation and between the rotating knives.

Hardened steel knives have served in the cutting and slitting of softer metals. As the need for cutting and slitting harder metals or materials such as transformer sheets coated with abrasives has grown, so that the need for better and more lasting knives become more acute.

Therefore, it is an object of my invention to provide a rotary cutting knife with at least one and preferably two cemented carbide cutting edges.

It is a further object of my invention to provide a rotary shearing knife having a cemented carbide "tire" or annulus embracing a cutting edge or edges mounted on a strong and serviceable "felly" or inner supporting body.

The joining as by brazing of a cemented carbide "tire" or annulus to a strong and serviceable "felly" or supporting body, such as of a disc of machineable steel to make, for example, a rotary shearing knife having an 8″ O.D., presents a problem. This problem arises from the fact that the two materials to be joined have quite different coefficients of thermal expansion. If a cemented carbide tire were mounted on a steel felly with a reasonably good fit at room temperature, upon heating the tire and felly to a temperature necessary for brazing one to the other, the steel felly would expand diametrically more than the cemented carbide annulus tending to rupture the latter. In all events, expansion of the steel felly sets up undesirable stresses in the cemented carbide tire. With clearance sufficient to permit brazing without bursting the tire, the greater contraction of the steel felly would set up undesirable stresses in the cemented carbide tire as well as in the brazed joint between the tire and the felly tending to split open the joint.

Therefore, a further object of my invention is to provide a method of joining, as by brazing, a cemented carbide tire or annulus having a cutting edge to a strong and serviceable steel felly or inner supporting disc or body.

I prefer to accomplish the foregoing objects of my invention using a cemented carbide tire of uniform and substantially rectangular cross section whose diameter is relatively large compared with its cross sectional dimensions; 8½″ I.D. and 10″ O.D. and ⅜″ thick, for example. To the inner periphery of the cemented carbide tire, I fit a plurality of arcuate segments of easily machineable steel, brazing the radially outward surface of each arcuate segment of steel to the adjoining portion of the inner periphery of the carbide tire or annulus. Preferably, the radially inward periphery of the tire and the radially outward periphery of the segments are cooperatively shaped to form a double bevel or tongue and groove type joint to resist axially directed shearing stresses. The arcuate steel segments thus form a discontinuous or segmented ring within the carbide tire; each segment being short enough to have been brazed to an arcuate portion of the tire without deleterious stress and with strong attachment to the tire, but without direct attachment of the steel segments to each other.

By brazing the cemented carbide tire or annulus to a felly made up of a plurality of circumferentially short arcuate segments having coefficients of thermal expansion different than that of the cemented carbide, I substantially eliminate the stresses imposed upon the tire or annulus which tend to burst it when the tire and felly are otherwise sought to be brazed together. Also, I greatly reduce or substantially eliminate the deleterious stresses set up in the cemented carbide tire and in the joints between the tire and the segmented felly when the parts are cooled from brazing temperatures to room temperature. This follows because, preferably, no segment bears against an adjacent segment.

I have also found that one suitable method of mounting the cemented carbide tire and its associated discontinuous or segmented felly to an arbor is to provide an inner supporting disc centrally apertured for mounting directly on the arbor and having a radially outward periphery closely conforming to and mechanically attachable unto the radially inward contour of the discontinuous felly. One manner in which this may be accomplished is by drilling holes, one for each segment, on the line of junction between the disc and the segments and placing into these holes, suitable fasteners which resist axial thrust applied to the junction as well as establish a driving relationship between parts joined. This method of mounting the cemented carbide tire and the discontinuous or segmented felly is especially suitable when the diameter of the knife is great relative to the diameter of the arbor.

These and other objects, features and advantages of my invention will appear from the following description of a preferred form of my invention, reference being had to the accompanying drawings in which.

Figure 1:
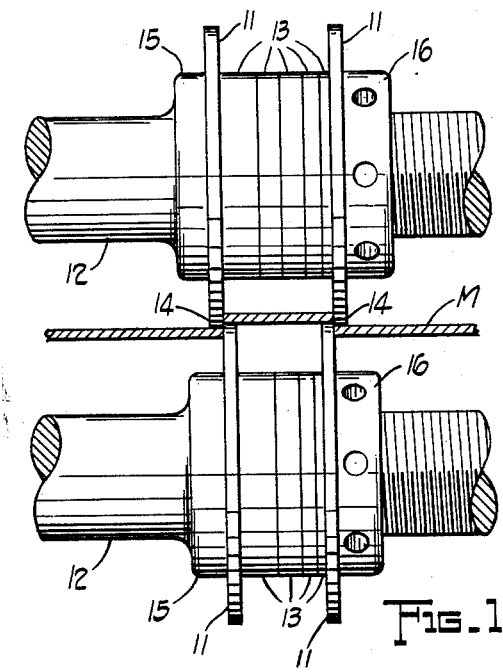
FIGURE 1 is an end elevation showing a metal slitting and shearing machine with rotary shearing knives such as those embraced by my invention coacting to slit and shear sheet material passing therebetween.

FIGURE 1 depicts one kind of metal shearing or slitting machine employing a plurality of rotary shearing knives 11 such as those of my invention. The knives 11 are mounted in a conventional manner on arbors 12 having parallel spaced axes. The arbors, for example, can each have an integrally formed annular shoulder 15. Knives 11 and shims 13 for spacing the knives apart can be then slipped onto the arbor 12 against shoulder 15. One end of the arbor can be threaded to receive a spanner nut 16 which holds the knives 11 and shims 13 against shoulder 15.

Figure 2:
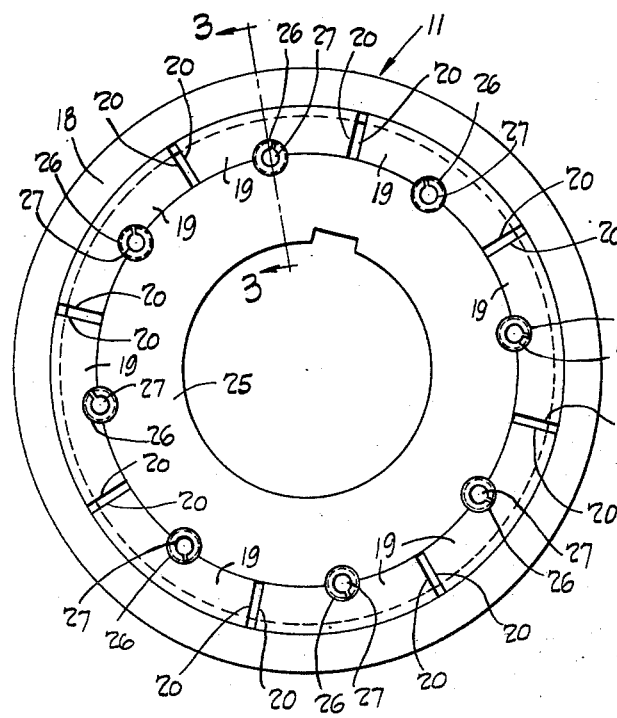
FIGURE 2 is a side elevation of a preferred embodiment of a rotary shearing knife of my invention detached from its arbor of FIGURE 1.
Figures 3, 4:
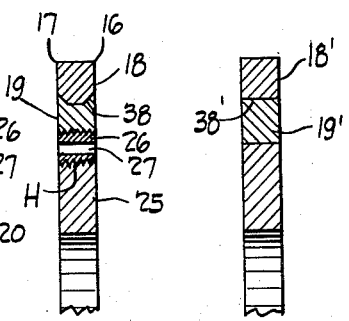
FIGURE 3 is a partial radial section taken in the plane of line 3—3 through the knife illustrated in FIGURE 2.
FIGURE 4 is a partial radial section through a modified form of a rotary shearing knife to show an alternate form of the brazed joint between the tire and felly of the knife.
Figure 8:
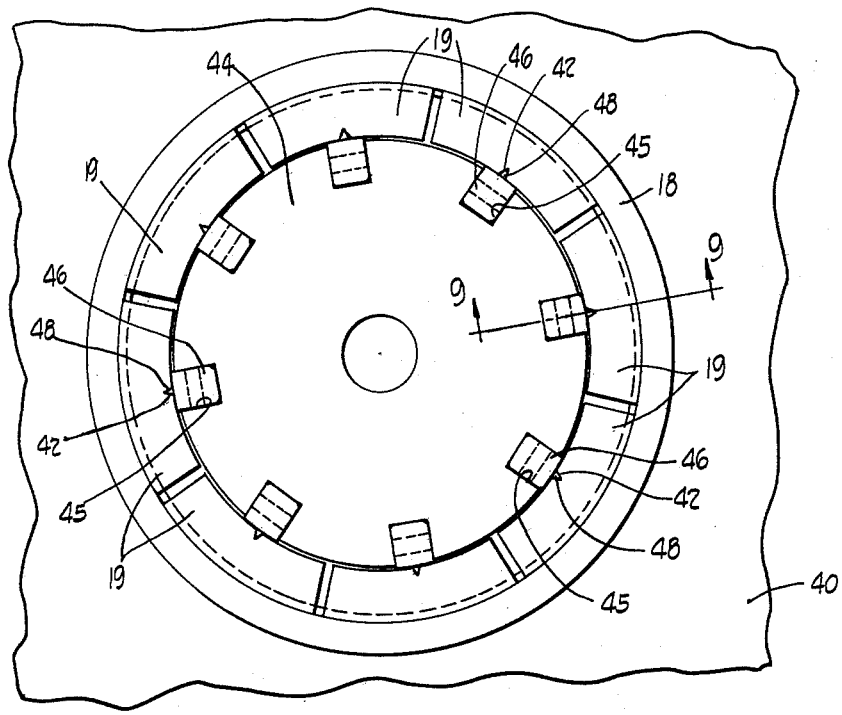
FIGURE 8 is a side elevation of the preferred embodiment of my invention of FIGURE 2 set up for brazing in a jig I prefer to use to practice the method of my invention.
Figure 9:
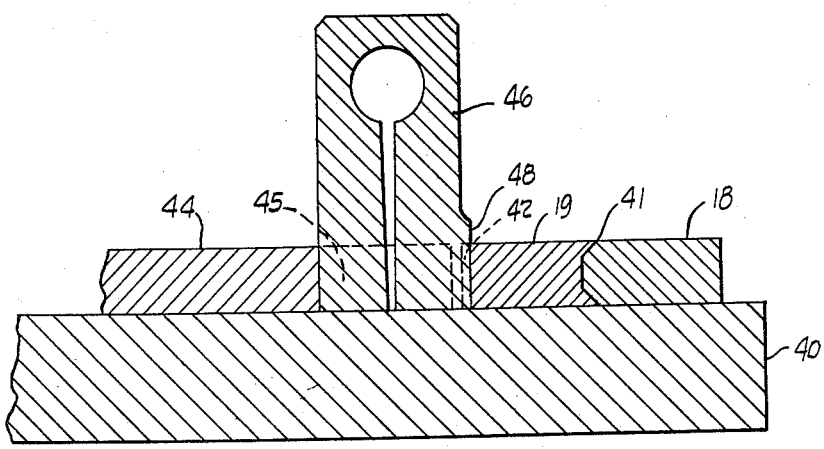
FIGURE 9 is a partial radial section on an enlarged scale taken in the plane of line 9—9 through the knife and jig illustrated in FIGURE 8.

Preferably, the outside diameter of shims 13 should be substantially less than the inside diameter of cemented carbide cutting ring 18, FIGURES 2–4. This shim diameter, in all events, must provide sufficient clearance for the work to pass between the arbors and shims mounted thereon having in mind that the outside diameter of the knives will be reduced by grinding when the cutting edges of the knives are sharpened. Shims 13, so sized, can provide maximum axial support for the knives, as well as maintain a fixed distance between the mounted knives.

A rotary shearing knife of my invention in its preferred embodiment, as shown in FIGURES 2 and 3, has two cutting edges 16 and 17 on the radially outward corners of a cemented carbide tire 18. The cemented carbide tire 18 is annular in form and has a substantially rectangular radial cross section (FIGURE 3). I prefer that the radially inward surface of tire 18 be given a transverse convex configuration as at 38, FIGURE 3, snugly complementary to the mating concave surfaces of the segments 19 where the parts are joined to each other.

I mount the cemented carbide tire 18 on a felly composed of a plurality of arcuate segments 19 of limited arcuate length whose radially outward surfaces are grooved to receive the annular convex inner surface of tire 18. These segments 19, preferably formed of a good machinable steel, are fastened as by brazing to the tire 18 so as to form a discontinuous or segmented felly. Each segment 19, when brazed to the tire 18, is independent of every other segment 19, in that all of the circumferential end surfaces 20 of the segments 19 are preferably spaced apart.

Alternatively, as shown in FIGURE 4, the joined surfaces 38' of the tire 18' and the segments 19' making up the felly may be formed so that the junction between the segments 19' and the tire 18' may be cylindrical and parallel to the axis of the knife. The junction may be further modified to be conical, not specifically shown, for resistance to unbalanced axial shearing forces or axial shearing forces to be opposed in one direction only that may be experienced under certain circumstances. I prefer, however, the tongue and groove or concave-convex type joint shown in FIGURE 3 for resisting both "right and left" axial shearing forces normally experienced when first one edge, or 16, is used until dull and then the knife reversed on the arbor to use the other edge, such as 17.

When the diameter of the arbor 12 upon which the knife is to be mounted is small relative to the diameter of the knife to be mounted thereon, I prefer to first mount the tire and felly upon a centrally apertured supporting disc 25, as shown in FIGURE 2, with a light press fit. Disc 25 can be of any suitable material, such as steel, and the fit between it and the tire and felly should be reasonably tight without imposing deleterious radial bursting stresses on the cemented carbide tire. When using such a supporting disc 25, I prefer to use a suitable mechanical fastening means to establish a driving relationship between disc 25 and each of the segments 19 of the discontinuous felly, as well as to insure sufficient resistance to axially directed shearing forces tending to separate the parts being joined.

Figure 6:
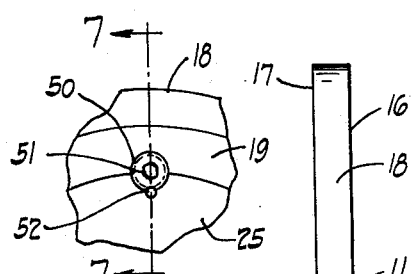
FIGURE 6 is a partial side elevation of the preferred embodiment of my invention of FIGURE 1, but showing an alternate form of fastening certain parts together.
Figure 7:
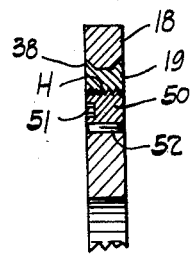
FIGURE 7 is a partial radial section taken in the plane of line 7—7 through the side elevation of FIGURE 6.
Figure 5:
FIGURE 5 is an end elevation of the knife shown in FIGURE 2.

Such a suitable fastening can be accomplished, as shown in FIGURES 2 and 3, by first drilling and tapping holes H, one for each segment, on the line of junction between the disc 25 and the segments 19. Suitable means, preferably split screws 26 slightly oversized for the tapped holes and having a tapered axial bore, are screwed therein. Tapered pins 27 are then driven into the tapered bores of the screws 26 to secure a tight fit between the threads of the screws and the tapped holes. The tight fit of the threads thus secured insures against the working out of the split screws 26 and causes them to fill the threads of the tapped holes so that the segmented felly is attached to the disc 25 in a manner to effectively resist axial thrust. FIGURES 6 and 7 show another suitable method of fastening accomplished by drilling and tapping holes H, one for each segment, on the line of junction between the disc 25 and the segments 19. A screw 50, having a hexagonal receptacle 51, is turned into each hole and locked in place by a hollow split pin 52 inserted in a hole bored on the line of junction of the screw 50 and supporting disc 25.

I prefer such fastening means as described above because they provide a maximum resistance to axial thrust by the coaction of the screw threads and tapped hole across the entire axial width of the parts being joined without any portion of the fastening projecting beyond the side walls of the annulus 18 and its cutting edges. Thus, there is no interference with the use of either cutting edge under any circumstance of mounting.

In a preferred method of making the rotary shearing knife of my invention, the cemented carbide tire 18 and the arcuate segments 19 are preferably arranged on a flat surface, such as a carbon slab 40 as shown in FIGURES 6 and 7, and so that each of the segments 19 is entirely free from contact with any adjoining segment. A ribbon of suitable brazing material 41, such as silver solder, is placed between the adjoining surfaces of the tire 18 and the segments 19. This ribbon of brazing material is preferably preformed to match the contour of the surfaces to be joined. At approximately the center of the radially inward surface of each of the segments 19, a small transverse notch 42 is made. A disc 44 of a suitable material, such as steel, is then placed on slab 40 within the discontinuous ring of segments 19; the disc 44 having an outside diameter slightly less than the inside diameter of the discontinuous ring; for example, $\frac{1}{16}$ inch less when making a ten inch knife.

In order to space the segments 19 about the inner periphery of the cemented carbide tire 18, as well as allow for the expansion of the jig disc 44 without bursting the tire 18 and yet, at the same time provide sufficient force to press the segments 19 in a brazing relationship under a desirable pressure with the tire 18, "finger" springs 46 are inserted in the square cut notches 45 of the jig disc 44. The finger springs 46 having a rectangular transverse cross section matching the square cut notches 45 into which they are fitted and which is modified on one side by a V-projection 48 fitting the V-notch 42 of segment 19. Each finger spring 46 has a small gap between the fingers which must be slightly reduced when the springs are positioned in notches 45 between the jig disc 44 and segments 19. This provides a safe useful pressure, even at room temperature, to hold the parts in alignment prior to their being brazed.

Upon completion of the assembly of the parts within the jig, the whole is preferably placed in an atmosphere controlled brazing oven and the brazing of the segments 19 to the tire 18 is accomplished. It will be noted that the jig and those parts assembled within it will change in dimenison at the elevated temperatures reached during the brazing. The jig disc 44, the segments 19 and the cemented carbide annulus 18 will all expand radially an amount dependent upon their respective coefficients of thermal expansion. The cemented carbide annulus 18 will undergo a lesser radial enlargement, however, than the jig disc 44 and the segments 19 located within it because of the lesser coefficient of thermal expansion of the annulus 18. The jig disc 44 and segments 19, having a greater coefficient of thermal expansion than the cemented carbide annulus 18, will, at elevated temperatures, undergo a greater enlargement than the annulus 18. The differential expansion of the jig disc 44, the segments 19 and the annulus 18 thus produce a force tending to burst the annulus 18.

This radial bursting force imposed on the annulus 18 is relieved in some measure by the fusing of the preformed ribbon of brazing material placed between the segments 19 and the inner periphery of the tire 18. In a ten inch knife, for example, the brazing ribbon 41 when placed between the segments 19 and the annulus 18 at room temperature will hold them apart approximately 0.005 inch. When the brazing temperature is reached and the braze completed, the segments 19 and the annulus 18 are approximately 0.001 of an inch apart, the segments 19 having each moved approximately 0.004 of an inch radially outward relative to the tire during the brazing.

The radial enlargement of the parts within the annulus 18, however, is greater than the reduction in radial dimension realized by the fusing of the brazing ribbon 41. Thus, the finger springs 46, in addition to providing the necessary force between the parts for securing a good brazed joint, prevent the bursting of tire 18 by cushioning and absorbing the force due to the net enlargement of the parts within the tire during the brazing operation.

The springs 46 must have sufficient gap between the free end of the fingers so that even after the gap is reduced upon their placement within the jig at room temperature to provide desirable brazing pressure, sufficient gap remains to absorb the net enlargement of the parts within the tire 18 and thus prevent the bursting of the tire. I prefer to use springs 46 which, for example, require from 12 to 15 pounds to reduce by half a gap of 1/16 inch between the ends of the fingers when making a ten inch knife. Depending upon the spring material, each successive firing of the springs may require that the springs be retempered with the gap between the free ends restored to its proper dimension.

In operation, the rotary shearing knives 11 of my invention are used in pairs or gangs of pairs mounted on parallel spaced axes 12. When one edge of each of the two knives 11 becomes worn and dull, the knives may be removed from the arbor and turned over so that the sharp unused edges form the point of shear. When both edges of the knives become dull, the cemented carbide annulus or ring of each may be ground to form new cutting edges. Since such grinding will reduce the outside diameter of the annulus or ring, the arbors then must be brought closer together to maintain the point of shear between the two knives.

The annulus of the knife may be repeatedly sharpened until any further sharpening will, for all practical purposes, consume the cemented carbide ring.

My rotary shearing knife thus can afford two continuous cutting edges of cemented carbide, each of which can be used successively without sharpening. The edges can then be renewed by sharpening and successively used again.

Those skilled in the art will appreciate that various changes and modifications can be made in the preferred form and example of my invention described herein without departing from the spirit and scope of the invention. Therefore, I do not desire to be limited in the scope of my patent to the forms of my inventions herein specifically illustrated and described nor in any manner inconsistent with the progress that my inventions have promoted the art.

I claim:

1. The method of making a rotary shearing knife having an outwardly disposed cemented carbide tire-like part having a cutting edge and having a low coefficient of thermal expansion and an inwardly disposed felly-like machineable part having a relatively great coefficient of thermal expansion comprising forming said tire-like part as a complete annular ring with surface areas adapted to be bonded to the other of said parts at an elevated temperature, forming said felly-like part with surface areas complementary to said first named surface areas and of a plurality or circumferentially discontinuous portions, bringing said parts into adjacency along said surface areas with a thermal bonding material disposed therebetween and with said discontinuous portions spaced apart circumferentially, disposing a central jig-like member interiorly of said felly-like part with its periphery in close proximity to said discontinuous portions, interposing resilient means between said jig-like member and said discontinuous portions for maintaining a pressure on said parts sufficient for bonding said surface areas together at elevated temperatures but less than enough to rupture said annular ring part, and bonding said parts together at elevated temperatures.

2. The method of making a rotary shearing knife having an outwardly disposed cemented carbide tire-like part having a cutting edge and having a low coefficient of thermal expansion and an inwardly disposed felly-like machineable part having a relatively great coefficient of thermal expansion comprising forming one of said parts as a complete annular ring with surface areas adapted to be bonded to the other of said parts at an elevated temperature, forming the other of said parts with surface areas complementary to said first named surface areas and of a plurality of circumferentially discontinuous portions, bringing said parts into adjacency along said surface areas with thermal bonding material disposed therebetween and with said discontinuous portions spaced apart circumferentially, backing said discontinuous portions with fixed resilient means for cushioning pressure developed by differential expansion of said parts at elevated temperatures to prevent rupture of said annular ring part, and bonding said parts together at elevated temperatures.

3. The method of making a rotary shearing knife having an outwardly disposed cemented carbide tire-like part having a cutting edge and having a low coefficient of thermal expansion and an inwardly disposed felly-like machineable part having a relatively great coefficient of thermal expansion comprising forming said tire-like part as a complete annular ring with surface areas adapted to be bonded to said felly-like part at an elevated temperature, forming said felly-like part with surface areas complementary to said first named surface areas and of a plurality of circumferentially discontinuous portions, bringing said parts into adjacency along said surface areas with thermal bonding material disposed therebetween and with said discontinuous portions spaced apart circumferentially, maintaining a pressure on said parts sufficient for bonding said surface areas together at elevated temperatures but less than enough to rupture said annular ring part, cushioning pressure developed by differential expansion of said parts at elevated temperatures to prevent rupture of said annular ring part, and bonding said parts together at elevated temperatures.

4. The method of making an annular shape having an outwardly disposed tire-like part having a low coefficient or thermal expansion and an inwardly disposed felly-like part having a relatively great coefficient of thermal expansion comprising forming said tire-like part as a complete annular ring with surface areas adapted to be bonded to the other of said parts at an elevated temperature, forming said felly-like parts with surface areas complementary to said first named surface areas and of a plurality of circumferentially discontinuous portions bringing said parts into adjacency along said surface areas with brazing material disposed adjacent said surface areas and with said discontinuous portions spaced apart circumferentially, disposing a central jig-like member interiorly of said felly-like part with its periphery in close proximity to said discontinuous portions, interposing resilient means between said jig-like member and said discontinuous portions for maintaining a pressure on said parts sufficient for bonding said surface areas together at elevated temperatures but less than enough to rupture said annular ring part, and bonding said parts together at elevated temperatures.

5. The method of making an annular shape having an outwardly disposed tire-like part having a low coefficient of thermal expansion and an inwardly disposed felly-like part having a relatively great coefficient of thermal expansion comprising forming one of said parts as a complete annular ring with surface areas adapted to be bonded to the other of said parts at an elevated temperature, forming the other of said parts with surface areas complementary to said first named surface areas and of a plurality of circumferentially discontinuous portions bringing said parts into contact along said surface areas with thermal bonding material disposed adjacent said contacting surface areas and with said discontinuous portions spaced apart circumferentially, backing said discontinuous portions with fixed resilient means for cushioning pressure developed by differential expansion of said parts to prevent rupture of said annular ring part, and bonding said parts together at elevated temperatures.

6. The method of making an annular shape having an outwardly disposed tire-like part having a low coefficient of thermal expansion and an inwardly disposed felly-like part having a relatively great coefficient of thermal expansion comprising forming one of said parts as a complete annular ring with surface areas adapted to be bonded to the other of said parts at an elevated temperature, forming the other of said parts with surface areas complementary to said first named surface areas and of a plurality of circumferentially discontinuous portions bringing said parts into contact along said surface areas with thermal bonding material disposed adjacent said contacting surface areas and with said discontinuous portions spaced apart circumferentially, maintaining a pressure on said parts sufficient for bonding said surface areas together at elevated temperatures but less than enough to rupture said annular ring part, cushioning pressure developed by differential expansion of said parts at elevated temperatures to prevent rupture of said annular ring part, and bonding said parts together at elevated temperatures.

7. The method of making a rotary shearing knife having an outwardly disposed tire-like hard part having a cutting edge and having a low coefficient of thermal expansion and also an inwardly disposed felly-like machineable part and a central hub-like machineable part having a relatively great coefficient of thermal expansion comprising forming said outwardly disposed part as a complete annular ring with a surface area adapted to be bonded to said inwardly disposed part at an elevated temperature, forming the said inwardly disposed part with surface areas complementary to said first named surface areas and of a plurality of circumferentially discontinuous portions, bringing said parts into contact along said surface areas with brazing material disposed adjacent said contacting surface areas and with said discontinuous portions spaced apart circumferentially, bonding said parts together at elevated temperatures without creating appreciable circumferential pressure between said portions, press fitting at ambient temperature said central hub-like part interiorly of said felly-like part, and mechanically keying said hub-like part to each of said discontinuous portions of said felly-like part.

8. A rotary shearing knife comprising a preformed continuous cemented carbide annulus having an annularly tongued radially inward periphery and at least one cutting edge on the radially outward periphery, and an inner annular supporting body consisting of a plurality of arcuate segments each having a transversely grooved radially outward periphery and each fixedly attached by a heating process at elevated temperatures to and extending radially inward from said tongued periphery of said annulus, and spaced apart from each other.

9. A rotary shearing knife comprising a preformed continuous cemented carbide annulus having two axially spaced cutting edges, an annular inner supporting body consisting of a plurality of arcuate segments of a material having a coefficient of thermal expansion different than that of cemented carbide, each of said segments being axially disposed between said two cutting edges and brazed to and extending inwardly from said annulus and being spaced apart from each other.

10. A rotary shearing knife comprising a preformed continuous cemented carbide annulus having one or more cutting edges, an inner supporting body consisting of a plurality of arcuate segments of a material having a coefficient of thermal expansion different than that of cemented carbide, the radially outward periphery of said segments being fixedly attached by a heating process at elevated temperatures to and extending radially inward from the radially inward periphery of said annulus and being spaced circumferentially from each other.

11. A rotary shearing knife comprising a preformed continuous cemented carbide annulus of substantially rectangular radial cross section having a transversely convex radially inward periphery and a radially outward periphery embracing at least one cutting edge, and an inner supporting body comprising an annularly arranged plurality of arcuate steel segments having a coefficient of thermal expansion different than that of cemented carbide and spaced circumferentially from each other and each having a transversely grooved radially outward periphery conforming to said convex radially inward periphery of said annulus, said conforming peripheries of said annulus and said segments being brazed or soldered into a fixed relationship.

12. A rotary shearing knife comprising a preformed continuous cemented carbide annulus having a radially outward periphery embracing one or two cutting edges, an inner supporting body consisting of an annularly arranged plurality of arcuate steel segments having a coefficient of thermal expansion different than that of cemented carbide and spaced apart from each other and each having a radially outward periphery conforming to the radially inward periphery of said annulus, said conforming peripheries of said annulus and said segments being brazed or soldered into a fixed relationship, and a rotatably driven circular supporting disc lying in the same plane as said annulus and said segments and having a radially outward periphery closely conforming to the radially inward periphery of said segments, each of said segments having an axially aligned keyway in the radially inward periphery thereof and said supporting disc having a plurality of axially aligned keyways in the radially outward periphery thereof radially opposite said keyways in said arcuate segments, and keying means fitted into said keyways whereby a driving relationship is established between each of said segments and said supporting disc.

13. A rotary shearing knife comprising a preformed continuous cemented carbide annulus of substantially rectangular radial cross section having an annularly tongued radially inward periphery and a radially outward periphery embracing one or two cutting edges, an inner supporting body consisting of an annularly arranged plurality of arcuate steel segments having a coefficient of thermal expansion different than that of cemented carbide and spaced apart from each other and each having a transversely grooved radially outward periphery conforming to the annularly tongued radially inward periphery of said annulus, said conforming peripheries of said annulus and said segments being brazed or soldered into a fixed relationship, and a rotatably driven circular supporting disc lying in the same plane as said segments and having a radially outward periphery closely conforming to the radially inward periphery of said segments, each of said segments having an axially aligned keyway in the radially inward periphery thereof and said supporting disc having a plurality of axially aligned keyways in the radially outward periphery thereof radially opposite said keyways in said arcuate segments, and keying means fitted into said keyways whereby a driving relationship is established between each of said segments and said supporting disc.

14. A rotary shearing knife comprising an outwardly disposed preformed and continuous annular part having two axially spaced cutting edges and having a coefficient of thermal expansion and a circumferentially discontinuous supporting body having a different coefficient of thermal expansion disposed inwardly of said annular part and axially between said two cutting edges and brazed to and extending radially inward from said annular part, and each discontinuous portion of said supporting body spaced apart from each other discontinuous portion of said supporting body.

References Cited in the file of this patent

UNITED STATES PATENTS

| | | |
|---|---|---|
| 643,200 | Rankert | Feb. 13, 1900 |
| 764,145 | McKenna | July 5, 1904 |
| 1,651,533 | Maynard | Dec. 6, 1927 |
| 1,859,978 | Metzger | May 24, 1932 |
| 2,154,035 | Cuddeback | Apr. 11, 1939 |
| 2,239,623 | Oster | Apr. 22, 1941 |
| 2,519,035 | Esty | Aug. 15, 1950 |
| 2,636,562 | Koehler | Apr. 28, 1953 |
| 2,648,177 | Mitchell et al. | Aug. 11, 1953 |

FOREIGN PATENTS

| | | |
|---|---|---|
| 897,187 | Germany | Mar. 26, 1953 |